(12) United States Patent
Johnson et al.

(10) Patent No.: US 10,364,847 B2
(45) Date of Patent: Jul. 30, 2019

(54) MOUNTING DEVICE

(71) Applicant: Fenner U.S., Inc., Manheim, PA (US)

(72) Inventors: Matthew Johnson, Mt. Wolf, PA (US); Nathan Mueller, Myerstown, PA (US)

(73) Assignee: Fenner U.S., Inc., Manheim, PA (US)

( * ) Notice: Subject to any disclaimer, the term of this patent is extended or adjusted under 35 U.S.C. 154(b) by 0 days.

(21) Appl. No.: 15/216,300

(22) Filed: Jul. 21, 2016

(65) Prior Publication Data

US 2018/0023628 A1     Jan. 25, 2018

Related U.S. Application Data

(60) Provisional application No. 62/364,634, filed on Jul. 20, 2016.

(51) Int. Cl.
*F16D 1/094*     (2006.01)
*F16D 1/08*     (2006.01)
*F16D 1/093*     (2006.01)

(52) U.S. Cl.
CPC .......... *F16D 1/094* (2013.01); *F16D 1/0829* (2013.01); *F16D 1/093* (2013.01);
(Continued)

(58) Field of Classification Search
CPC .......... F16D 1/0829; F16D 1/05; F16D 1/093; F16D 1/094; F16D 1/104;
(Continued)

(56) References Cited

U.S. PATENT DOCUMENTS

| 1,687,777 A | 10/1928 | McMurtrie et al. |
| 2,147,343 A * | 2/1939 | Hokanson ............... E21B 17/04 |
| | | 285/332.4 |

(Continued)

FOREIGN PATENT DOCUMENTS

| CN | 2491641 | 5/2002 |
| DE | 3444608 | 6/1986 |

(Continued)

OTHER PUBLICATIONS

"Flange Face Surface Finish." 2011, Sunny Steel Enterprise Ltd, [retrieved on Jul. 5, 2018]. Retrieved from the internet <URL: www.sunnysteel.com/Flange-Face-Surface-Finish.php>. (Year: 2011).*

(Continued)

*Primary Examiner* — Josh Skroupa
*Assistant Examiner* — Cory B Siegert
(74) *Attorney, Agent, or Firm* — Stephen H. Eland; Dann, Dorfman Herrell & Skillman (57) ABSTRACT

A mounting device connects a rotary shaft to a rotatable machine element. The mounting device includes an inner sleeve for clamping onto the shaft and an outer sleeve for clamping onto the machine element. The inner and outer sleeves have cooperating tapered surfaces for tightening the mounting device. The cooperating tapered surfaces include striations. A nut connected with the inner and outer sleeves is rotatable to drive the inner sleeve relative to the outer sleeve in a first direction to tighten the inner sleeve onto the shaft and the outer sleeve onto the machine element.

23 Claims, 5 Drawing Sheets

(52) U.S. Cl.
CPC .... *Y10T 403/7056* (2015.01); *Y10T 403/7058* (2015.01); *Y10T 403/7069* (2015.01)

(58) Field of Classification Search
CPC .......... Y10T 403/7056; Y10T 403/7058; Y10T 403/7067; Y10T 403/7069; F16B 2/005
USPC ........ 403/370, 371, 374.3, 374.4; 464/42–44
See application file for complete search history.

(56) References Cited

U.S. PATENT DOCUMENTS

| | | | |
|---|---|---|---|
| 2,819,090 A | 1/1958 | Stenberg | |
| 2,930,642 A | 3/1960 | Howlett | |
| 3,003,149 A | 10/1961 | Grashow | |
| 4,202,644 A | 5/1980 | Soussloff | |
| 4,345,851 A | 8/1982 | Soussloff | |
| 4,367,053 A | 1/1983 | Stratienko et al. | |
| 4,407,603 A | 10/1983 | Lundgren | |
| 4,481,702 A | 11/1984 | Mitchell | |
| 4,543,704 A | 10/1985 | Soussloff | |
| 4,598,443 A | 7/1986 | Ostling et al. | |
| 4,600,334 A | 7/1986 | Soussloff | |
| 4,615,640 A | 10/1986 | Hosokawa | |
| 4,623,277 A | 11/1986 | Wayne et al. | |
| 4,824,281 A | 4/1989 | Katsube | |
| 5,009,539 A | 4/1991 | Muellenberg | |
| 5,046,695 A * | 9/1991 | Vuorenmaa | E04H 12/32 160/399 |
| 5,067,846 A | 11/1991 | Staniszewski | |
| 5,067,847 A | 11/1991 | Muellenberg | |
| 5,072,072 A | 12/1991 | Bawa et al. | |
| 5,145,277 A | 7/1992 | Fujita et al. | |
| 5,137,406 A * | 8/1992 | Cosenza | F16L 32/005 411/113 |
| 5,161,928 A | 11/1992 | Burdick, Jr. | |
| 5,209,594 A | 5/1993 | Svensson et al. | |
| 5,308,183 A | 5/1994 | Stegeman et al. | |
| 5,374,135 A | 12/1994 | Folsom et al. | |
| 5,474,403 A | 12/1995 | Hetrich | |
| 5,571,184 A * | 11/1996 | DeSatnick | A61F 2/0805 403/368 |
| 5,695,297 A | 12/1997 | Geib | |
| 6,000,875 A | 12/1999 | Staniszewski | |
| 6,261,185 B1 | 7/2001 | Peterson et al. | |
| 6,357,958 B1 | 3/2002 | Geib et al. | |
| 6,361,243 B1 | 3/2002 | Geib | |
| 9,334,895 B2 * | 5/2016 | Fabre | F16B 13/063 |
| 2005/0023226 A1 | 2/2005 | Bastick et al. | |
| 2005/0089364 A1 * | 4/2005 | Geib | F16B 9/023 403/370 |
| 2005/0220534 A1 | 10/2005 | Ober | |
| 2008/0144986 A1 | 6/2008 | Wajda | |

FOREIGN PATENT DOCUMENTS

| | | |
|---|---|---|
| DE | 10219931 | 11/2003 |
| EP | 318977 | 9/1993 |
| EP | 799389 | 7/2000 |
| FR | 2490753 | 3/1982 |
| JP | 56080524 | 7/1981 |
| WO | 90/01387 | 2/1990 |

OTHER PUBLICATIONS

"Flange Face Surface Finish." 2011, Sunny Steel Enterprise Ltd, [retrieved on Jul. 5, 2018]. Retrieved from the internet <URL: http://www.sunnysteel.com/Flange-Face-Surface-Finish.php>. (Year: 2011).*

B-Loc Installation & Removal Instructions, 2013.

* cited by examiner

MOUNTING DEVICE

PRIORITY APPLICATION

This application claims priority to U.S. Provisional Application No. 62/364,634 filed Jul. 20, 2016. The entire disclosure of the foregoing application is hereby incorporated herein by reference.

FIELD OF THE INVENTION

The present invention relates to a mounting device for mounting a machine element upon a shaft in such a manner that the entire torque and/or thrust is transmitted between the machine element and the shaft without significant slippage due to the mounting. In particular, the device of the present invention provides an improved mounting device for mounting machine elements permitting infinitely-variable adjustment of the machine element on the shaft, both axially of the shaft and circumferentially thereof, and maintaining the machine element at a fixed, axial position after mounting on the shaft.

BACKGROUND OF THE INVENTION

The use of devices for mounting machine elements, such as pulleys and gears, upon a shaft is well-known. One difficulty is that the known devices for mounting a machine element upon a cylindrical shaft are cumbersome to use. For example, some devices require assembly of multiple pieces and adjustment of several screws, and other devices require modification of the shaft on which the machine element is mounted.

Another difficulty frequently encountered relates to the need for precise positioning of the machine elements circumferentially and/or axially on the shaft when the machine element is mounted upon the shaft. Specifically, it is desirable to position the machine element at a particular axial position and maintain the element at such position after the element is attached to the shaft. In addition, it is desirable to allow for the infinitely-variable adjustment of the machine element circumferentially prior to attaching the element to the shaft.

SUMMARY OF THE INVENTION

In light of the foregoing, an apparatus is provided for coupling a rotary shaft with a rotatable element, such as a machine element.

According to one aspect, the present invention provides device for coaxially mounting a machine element onto a shaft. The device includes a nut, an inner sleeve and an outer sleeve. The nut includes threads and a first connector. The outer sleeve includes an external surface configured to cooperate with a machine element and a tapered internal surface. The outer sleeve may also include at least one axial slot extending longitudinally along the outer sleeve to permit radial expansion of the outer sleeve. The outer sleeve also includes a plurality of striations formed on the tapered internal surface. The inner sleeve includes a tapered external surface corresponding in angle of taper to the tapered internal surface of the outer sleeve and may also include at least one axial slot extending longitudinally along the inner sleeve to permit radial expansion of the inner sleeve. The inner sleeve also includes a plurality of striations formed on the tapered external surface. The nut is connected with the inner sleeve and the outer sleeve so that rotating the nut in a first direction drives the inner sleeve relative to the outer sleeve in a first direction to tighten the outer sleeve onto the machine element and the inner sleeve against the shaft. Additionally, rotating the nut in a second direction drives the inner sleeve relative to the outer sleeve in a second direction to loosen the outer sleeve from the machine element and the inner sleeve from the shaft.

According to another aspect, the present invention provides a method for forming a mounting device to mount a machine element onto a shaft. The method includes the step of forming an inner sleeve having an inner bore for clamping onto a shaft and frustoconical portion having a tapered outer surface. The step of forming an inner sleeve comprises the step of cutting striations into the frustoconical surface. The method also includes the step of forming an outer sleeve having an inner tapered surface configured to mate with the frustoconical portion of the inner sleeve and an outer surface configured to clamp onto a machine element. The step of forming an outer sleeve comprises the step of cutting striations into a tapered internal surface of an outer sleeve that circumscribes the inner sleeve. The method also includes the step of connecting a threaded nut to the inner sleeve and the outer sleeve, so that rotation of the nut drives the inner sleeve axially relative to the outer sleeve so that rotating the nut in a first direction tightens the inner sleeve against the outer sleeve and rotating the nut in a second direction loosens the inner sleeve from the outer sleeve.

According to yet another aspect, the invention provides a device for coaxially mounting a machine element having a bore upon a shaft. The device includes a threaded tightening element, an outer sleeve and an inner sleeve. The outer sleeve has an external surface configured to cooperate with a machine element, such as a rotatable element. The outer sleeve also includes a tapered internal surface having a plurality of striations formed on the tapered internal surface. The inner sleeve is configured to encircle a rotary element, such as a rotary shaft. The inner sleeve includes a tapered external surface corresponding in angle of taper to the tapered internal surface of the outer sleeve and a plurality of striations formed on the tapered internal surface. One of the inner and outer sleeves comprises a threaded portion cooperable with the threaded tightening element. Rotating the threaded tightening element in a first direction displaces the inner sleeve in a first direction relative to the outer sleeve, thereby causing the inner sleeve to contract against the shaft and the outer sleeve to expand against the bore of the machine element.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
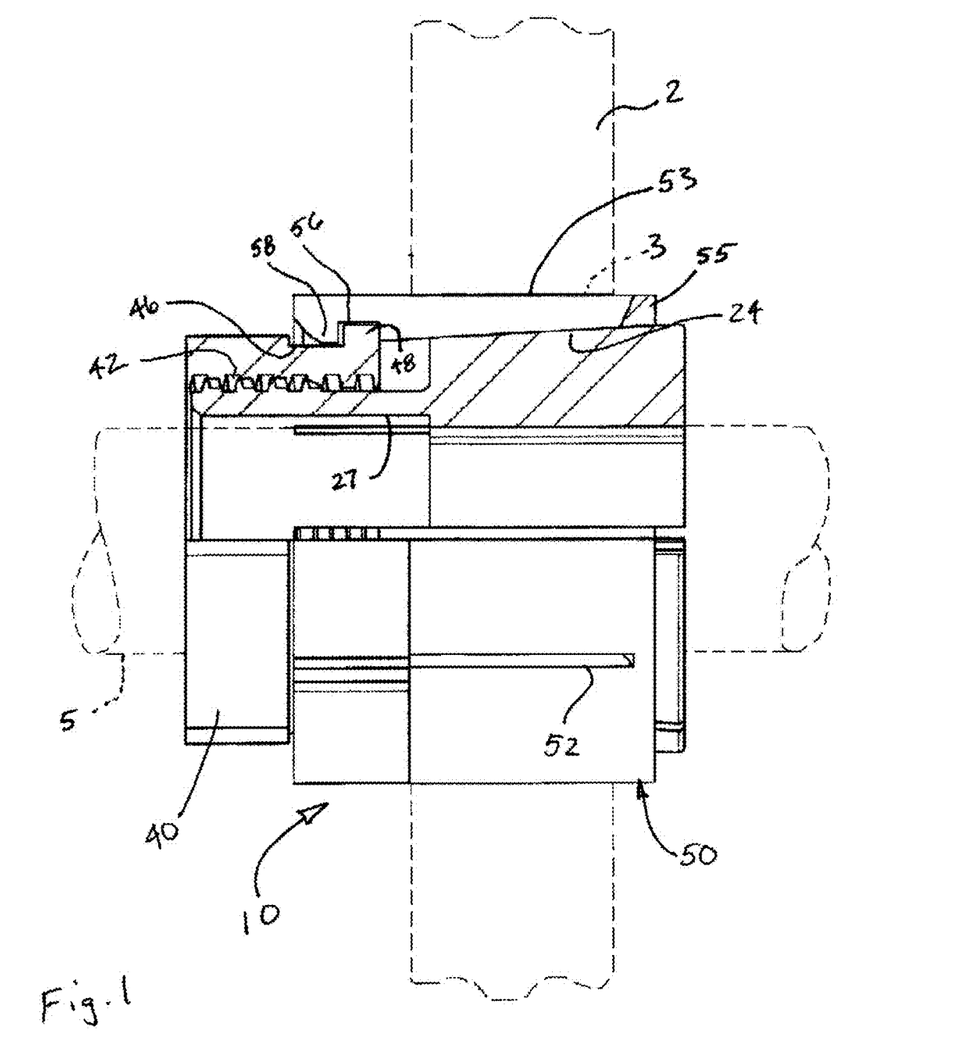
FIG. 1 is a side view partially in section of a mounting device.

Referring now to the drawings and to FIG. 1 specifically, a mounting device is designated generally 10. The mounting device is designed to mount a first element, such as a machine element 2, onto a second element, such as a shaft 5. The machine element 2 has a bore that engages the external surface of the mounting device 10 and the shaft 5 has a surface that engages the internal surface of the mounting device 10 designed to mount the hub of a machine element 2 upon a cylindrical shaft 5. The mounting device is designed to be positioned between the machine element 2 and the shaft 5 and to be expanded to securely anchor the machine element 2 onto the shaft at any desired position axially of the shaft and any angular position circumferentially of the shaft.

Figure 2A:
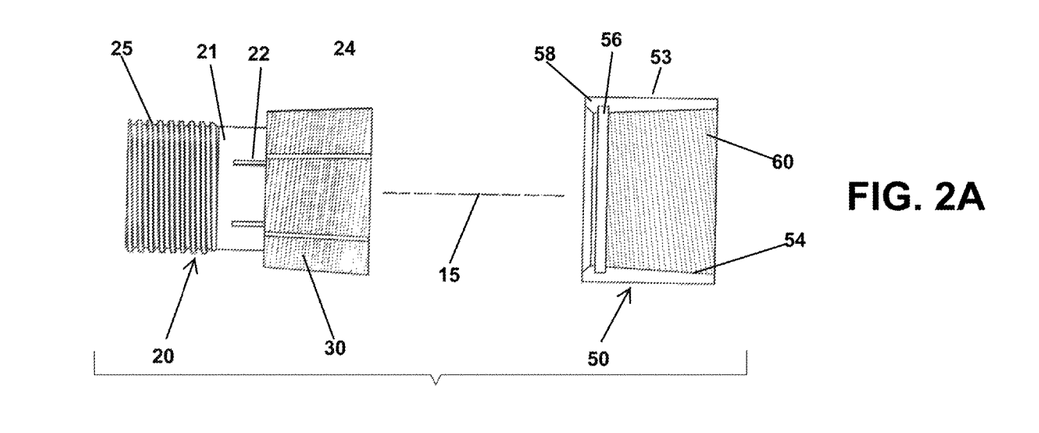
FIG. 2A is an exploded view, partially in section of inner and outer sleeves of the mounting device illustrated in FIG. 1.
Figure 2B:
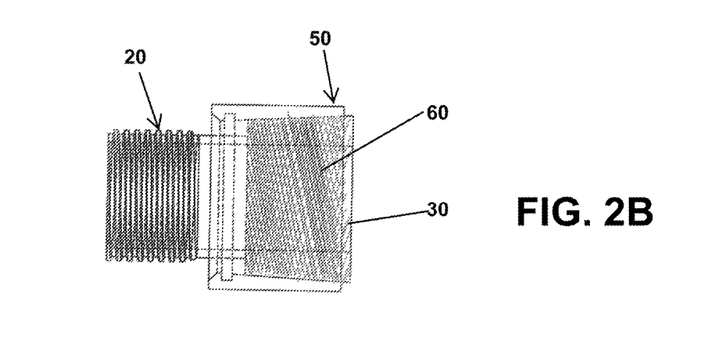
FIG. 2B is assembled view of the inner and outer sleeves illustrated in FIG. 2A highlighting overlapping striations of the sleeves.

Referring to FIGS. 1 & 2, the mounting device 10 includes an inner sleeve 20, an outer sleeve 50, and a locking nut 40. The inner sleeve 20 is tubular in form having an internal bore that cooperates with the external surface of the shaft 5. Specifically, if the external surface of the shaft is tapered or frustoconical the internal surface of the inner sleeve has a cooperating tapered or frustoconical surface. In the present instance, the shaft is cylindrical, and the inner sleeve 20 has a cylindrical bore with a diameter that corresponds to the diameter of the shaft 5. Preferably, the bore of the inner sleeve is slightly greater in diameter than the shaft 5 to permit free sliding movement of the inner sleeve 20 on the shaft 5 both axially and circumferentially.

The inner sleeve 20 may comprise a generally cylindrical rearward portion 21 (see FIG. 2). The inner sleeve also includes an enlarged frustoconical gripping portion 24. The gripping portion 24 provides an externally tapered surface configured to cooperate with the outer sleeve as discussed further below. The rearward portion of the inner sleeve may comprise externally threaded portion 25 that threadedly engages the nut.

Referring to FIG. 2, the gripping portion 24 of the inner sleeve includes a plurality of striations 30 on the outer surface. The striations may be formed of a plurality of grooves, furrows or ridges around the exterior surface of the gripping portion 24. Additionally, the striations 30 may form a plurality of convolutions around the circumference of the inner sleeve 24. The convolutions may wrap around the entire circumference of the gripping surface. The convolutions may be interconnected so that the striations 30 form a single continuous helical groove, furrow or ridge forming a plurality of overlapping convolutions around the exterior of the gripping portion. Alternatively, the striations 30 may be formed as a plurality of separate grooves, furrows or ridges that do not intersect one another.

The striations 30 have minimal depth compared to the wall thickness of the inner sleeve 20. The depth of the striations is measured with respect to the distance that the striation extends in a radial direction relative to the axis 15 of the device 10. For instance, the striations 30 may be less than 0.010" or 0.25 mm deep. In particular, the striations 30 may by less than 0.005" or 0.13 mm deep. Additionally, the striations may be approximately 0.001" or approximately 0.025 mm deep. In the present instance, the striations are less than approximately 0.01 mm and greater than 0.0002 mm deep. In particular, the striations may be than 0.001 mm deep and greater than 0.0005 mm deep.

Additionally, in the present instance, the striations are spaced less than 1.0 mm from one another. In particular, the striations may be spaced less than 0.5 mm from one another. In the present instance, the striations are spaced apart approximately 0.15 mm from one another.

Figure 3:
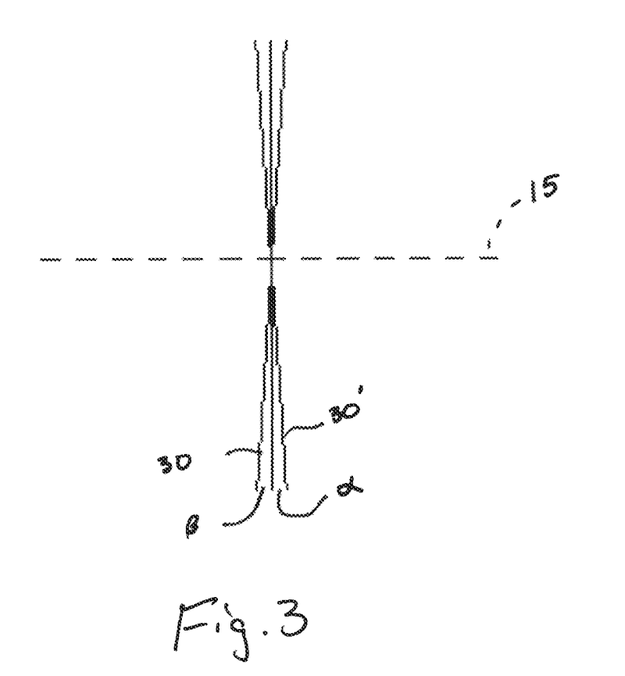
FIG. 3 is a diagrammatic view of striations of the inner and outer sleeves illustrated in FIG. 2.

Referring to FIG. 3, the striations 30 are formed at an angle to the axis of rotation 15 of the device. In FIG. 3, a striation of the inner sleeve is designated 30 and a striation of the outer sleeve is designated 60. The striations 30, 60 are formed at an angle, which is a lead angle. Specifically, the lead angle is the angle formed between the striations and a plane that is normal to the axis of rotation. The lead angle for a striation 30 of the inner sleeve is designated $\alpha$. The lead angle for the striation 60 of the outer sleeve is designated $\beta$. As shown in FIG. 3, the striations of the inner and outer sleeves are formed at an angle to one another.

The lead angle $\alpha$ of the inner sleeve 20 striations 30 are preferably less than 5°. The lead angle $\alpha$ also is preferably greater than approximately 0.25°. The lead angle $\alpha$ may be less than 10°. In particular, the lead angle $\alpha$ may be less that approximately 3° so that the lead angle may be between approximately 0.25° and 3°. The lead angle $\beta$ of the outer sleeve 50 may have an absolute value that is similar to the lead angle of the inner sleeve. For instance, the lead angle $\beta$ may be less than 20° and $\beta$ preferably has an absolute value that is less than 10°. The absolute value of lead angle $\beta$ also is preferably greater than 0.25°. The absolute value of lead angle $\beta$ may be less than 3°. In particular, the absolute value of lead angle $\beta$ may be between approximately 0.25° and 3°. Although $\alpha$ and $\beta$ may have the same magnitude, the do not necessarily have the same absolute value. In other words, $\alpha$ may be 3° and $\beta$ may be −3°, so that both angles have the same absolute value, but the angles are transverse because one is positive relative to the vertical axis, whereas the other angle is negative relative to the vertical axis. Alternatively, $\alpha$ and $\beta$ may have different absolute values rather than having the same absolute value. In this way, $\alpha$ and $\beta$ are transverse one another so that when the device is assembled the striations overlap to form a mesh as shown in FIG. 2.

The striations 30, 60 of the inner and outer sleeves are preferably formed at an angle to one another, as shown in FIG. 3. In particular, the striations 30, 60 may be formed so that they are opposite handed convolutions. For instance, the convolutions of the inner sleeve striations 30 may be right handed convolutions and the outer sleeve convolutions may be left handed striations. In this way, the lead angle $\alpha$ of the inner sleeve 50 striations 30 may be a positive value while the lead angle $\beta$ of the outer sleeve striations may be a negative value. In particular, the outer sleeve striations may have a lead angle having a magnitude similar to the inner sleeve striations, but of the opposite sign. For instance, the inner sleeve striations 30 may have a lead angle $\alpha$ of approximately 3° and the outer sleeve striations 60 may have a lead angle $\beta$ of approximately −3° as shown in FIG. 3.

The inner sleeve 20 engages the shaft 5 by contracting so that the inner sleeve grips or clamps down onto the shaft. For this purpose, the inner sleeve 20 is formed into a plurality of segments by slots 22 that extend longitudinally through the sleeve from the forward end. The slots 22 allow radial deflection of the inner sleeve as the mounting device is tightened or released. The slots may terminate along a line spaced inwardly from the rearward end of the inner sleeve 20. In this way, the free end portion of the threaded end of the inner sleeve 20 may be an unsplit solid continuous ring portion. This solid portion of the inner sleeve would provide greater thread strength and improved threaded engagement with the nut 40, relative to a sleeve that is split along the entire axial length. In the present instance, the inner sleeve is formed of steel and has six equally spaced slots approximately 5/64" in width. It will be recognized, however, that the number of slots, as well as the width, length and spacing of the slots can be varied to achieve the desired flexibility. Similarly, the material from which the inner sleeve is formed may be varied depending upon the application.

Although the bore of the inner sleeve 20 is generally cylindrical to cooperate with the shaft, preferably, the bore includes an enlarged diameter portion 27, as shown in FIG. 1. More specifically, preferably the bore of the portion of the inner sleeve that extends rearwardly from the frustoconical portion 24 has a larger diameter 27 than the bore of the inner sleeve in the portion of the sleeve that is co-extensive with the frustoconical portion. The length of the enlarged diameter bore 27 can be shorter than described above. However, preferably the enlarged bore is at least co-extensive with the portion of the inner sleeve extending from the rearward edge to a line demarking the termination of slots 22.

To provide the enlarged bore, a counterbore 27 may be formed in the rearward portion of the inner sleeve 20. The forward edge of the counterbore 27 is formed by a shoulder. Preferably, the counterbore is larger than the diameter of the bore adjacent the forward end of the inner sleeve. In other words, the counterbore 27 has a larger inner diameter than the bore through the gripping portion 24.

The inner sleeve 20 is adapted to fit within the outer sleeve 50, which may be a unitary sleeve having a plurality of axial slots 52 extending from the rearward end of the outer sleeve. The axial slots 52 permit radial deflection of the outer sleeve 50 as the mounting device 10 is tightened and released. The outer surface of the outer sleeve 50 has an engaging surface 53 that is configured to cooperate with the internal bore 3 of the machine element 2. For example, the machine element bore 3 may be cylindrical and the engaging surface 53 of the outer sleeve may correspondingly be generally cylindrical. Alternatively, the engaging surface 53 of the outer sleeve may be frustoconical to cooperate with a machine element having a tapered bore 3. In addition, the engaging surface 53 may be sufficiently smaller than the bore 3 of the machine element to permit free sliding movement between the machine element and the outer sleeve when the mounting device is not tightened.

As shown in FIG. 1, the inner surface of the outer sleeve 50 is configured to cooperate with the external surface of the inner sleeve. The inner and outer sleeves 20, 50 have mating tapered surfaces that cooperate to wedge the outer sleeve outwardly while contracting the inner sleeve inwardly. More specifically, the inner surface of the outer sleeve 50 tapers toward the forward end at the same angle of taper as the frustoconical portion 24 of the inner sleeve 20. In other words, the bore of the outer sleeve is tapered. The interior of the outer sleeve may be tapered so that so that the major diameter of the bore is adjacent the forward end of the outer sleeve and the minor diameter of the bore is spaced rearwardly from the forward end. In this way, when the inner sleeve 20 is displaced rearwardly relative to the outer sleeve 50 (i.e. from right to left in FIG. 1), the confronting tapered surfaces of the inner and outer sleeves cooperate to expand the external tapered surface of the outer sleeve and contract the internal cylindrical surface of the inner sleeve 20. In addition, since the inner and outer sleeves are coaxial, the contraction and expansion of the inner and outer sleeve surfaces is substantially parallel to the common central axis of the assembly.

As discussed above, referring to FIG. 2, the internal surface 54 of the outer sleeve 50 is configured to cooperate with the external tapered surface 24 of the inner sleeve 20. The internal surface 54 also includes a plurality of striations 60 that are configured similarly to the striations 30 on the inner sleeve. In particular, the striations 60 may be a plurality of overlapping convolutions. The striations 60 may also be connected or may be separation convolutions. As discussed above, the striations 60 may have a lead angle that has an absolute value similar to the magnitude of the lead angle of the striations 30 on the inner sleeve.

As shown in FIG. 2, when the inner sleeve 20 is inserted into the outer sleeve, the striations 30 of the inner sleeve 20 overlap the striations 60 in the outer sleeve. The striations 60 are configured transverse the striations 30. The overlapping striations 30, 60 form a mesh as shown in FIG. 2.

An annular groove 56 extends circumferentially around the inner surface of the outer sleeve 50 adjacent the rearward end of the outer sleeve. The rearward wall of the annular groove 56 may form an annular flange 58 as shown in FIG. 1. The nut 40 engages the groove 56 to connect the nut to the outer sleeve 50 as discussed further below.

The nut 40 has an internal bore that is larger than the diameter of the shaft 5. In addition, preferably the outer diameter of the nut is smaller than the outer diameter of the outer sleeve 50. However, in some applications the nut may be larger in diameter than the outer sleeve without affecting the use of the device, particularly when the device is configured to mount a tapered bore machine element, as in the present instance, The nut 40 is connected with both the inner sleeve 20 and the outer sleeve 50. Rotating the nut in a first direction displaces the inner sleeve relative to the outer sleeve to loosen the device. Rotating the nut in a second direction, opposite the first direction, displaces the inner sleeve relative to the outer sleeve in an opposite direction to tighten the device as discussed further below.

The nut 40 has threads 42 that threadedly engage the threads 25 of the inner sleeve 20. The threads 42 may be internal threads as shown in FIG. 1. The nut 40 may be connected to the outer sleeve 50 to impede substantial axial displacement between the nut and the outer sleeve. To provide a connection between the nut 40 and the outer sleeve 50, the nut may have an external circumferential groove 46 adjacent the flange. The forward wall of the groove 46 may form a circumferential flange 48 as shown in FIG. 1. The forward and rearward sidewalls of the groove 46 may be substantially perpendicular to the common axis of the assembly.

The external flange 48 of the nut may engage the annular groove 56 of the outer sleeve, and the internal flange 58 of the outer sleeve may engage the circumferential groove 46 of the nut. Accordingly, the external flange 48 of the nut may have a width slightly less than the width of the internal groove 56 of the outer sleeve, and the internal flange 58 of the outer sleeve may have a width slightly less than the width of the circumferential groove 46 of the nut. In this way, the rearward face of the external nut flange 48 may confront the rearward face of the annular groove 56 of the outer sleeve to affect rearward axial force on the outer sleeve 50 when the nut is rotated to drive the inner sleeve rearwardly relative to the nut. Similarly, the forward face of the external nut flange 48 may confront the forward face of the annular groove 56 of the outer sleeve to affect forward axial force on the outer sleeve when the nut is rotated to drive the inner sleeve 20 forwardly relative to the nut.

The inner diameter of the internal flange 58 of the outer sleeve may be smaller than the outer diameter of the external flange 48 on the nut. The internal flange 58 on the outer sleeve may pass over the nut flange 48 to connect the outer sleeve to the nut. Therefore, to connect the outer sleeve 50 to the nut 40, the outer sleeve may be sufficiently flexible to allow the outer sleeve to expand over the outwardly extending flange of the nut. Accordingly, the outer sleeve 50 may be formed into a plurality of segments by means of slots 52 that extend axially longitudinally of the sleeve from the rearward end. All of the slots 52 terminate along a line spaced inwardly from the forward end of the outer sleeve 50. However, the outer sleeve may include a slot that extends through the entire length of the outer sleeve.

The termination of the slots 52 combined with the through-slot provides a split web 55 joining the segments at the forward end. For instance, the outer sleeve 50 may be made from steel, or other metal, including, but not limited to, brass or stainless steel and provided with six equally spaced slots approximately 5/64" in width, five of which are terminated slots, and one of which is the through slot. It will be recognized, however, that the number of slots, as well as the width, length and spacing of the slots can be varied to achieve the requisite flexibility. The axial length of the web 55 at the forward end may be sufficiently small to allow the outer sleeve to deflect radially to connect the outer sleeve to the nut.

The mounting device 10 is assembled as follows. The nut 40 is threaded onto the inner sleeve 20. The outer sleeve 50 is connected to the nut 40 by sliding the outer sleeve over the inner sleeve 20 until the internal flange 58 on the outer sleeve engages the external flange 48 of the nut. Because the outer sleeve slides over the inner sleeve during assembly, the nut may be threaded onto the inner sleeve a sufficient distance so that the mating frustoconical surfaces 24, 53 of the inner and outer sleeves do not engage each other during assembly.

After sliding the outer sleeve 50 over the inner sleeve 20, the outer sleeve is connected to the nut 40 by driving the outer sleeve over the nut as follows. As the outer sleeve engages the nut, the outer sleeve flexes and expands radially outwardly over the nut flange 48. To facilitate the radial expansion, the rearward face of the internal flange 58 of the outer sleeve may be chamfered as illustrated in FIG. 1. The outer sleeve is displaced rearwardly relative to the nut until the internal flange 58 of the outer sleeve is displaced past the external nut flange 48. The outer sleeve then resiliently contracts so that the internal flange 58 of the outer sleeve is engaged in the circumferential groove 46 around the nut, and the external nut flange 48 is engaged in the annular groove 56 in the outer sleeve. In this way, the outer sleeve 50 is captively entrained by the nut 40.

The mounting device 10 operates as follows. The device 10 is mounted onto a first element, such as a shaft 5, by sliding the device over the shaft so that the shaft slides through the inner bore of the inner sleeve 20 and the bore of the nut 40. A second element, such as a machine element 2 may be mounted onto the device by sliding the machine element over the shaft and then over the mounting device so that the outer surface 53 of the outer sleeve 50 engages the bore 3 of the machine element. Alternatively, the mounting device 10 can be inserted into the bore 3 of the machine element first and the two can be slid onto the shaft 5 together. Either way, the mounting device is positioned on the shaft so that the bore of the inner sleeve 20 confronts the shaft and the external engaging surface 53 of the outer sleeve 50 confronts the bore of the machine element 2.

To lock the machine element onto the shaft, the nut is rotated. The wedging action of the inner and outer sleeves is provided by displacing the inner sleeve rearwardly relative to the outer sleeve. Specifically, when the device is in a loosened position, the inner sleeve is located within the outer sleeve so that the major diameter of the inner sleeve frustoconical portion 24 is positioned within a portion of the outer sleeve bore having a diameter that is at least as great as the major diameter of the inner sleeve frustoconical portion. In other words, in the loosened position, the inner sleeve 20 does not contact the bore of the outer sleeve to provide a wedging or clamping force.

Rotating the nut 40 in a forward direction displaces the inner sleeve 20 rearwardly relative to the outer sleeve 50 so that the tapered surface of the frustoconical portion of the inner sleeve is driven into the inner tapered bore of the outer sleeve. Because the outer sleeve tapers inwardly to a smaller diameter bore at the rearward end, driving the inner sleeve rearwardly wedges the outer sleeve so that the outer sleeve deflects radially outwardly to expand the outer sleeve in the bore 3 of the machine element to lock onto the machine element. At the same time, the wedging force deflects the inner sleeve 20 radially inwardly so that the inner sleeve contracts to lock the inner sleeve onto the shaft 5. To release the connection between the machine element, mounting device and shaft, the nut is rotated in a reverse direction. The reverse rotation displaces the inner sleeve forwardly relative to the outer sleeve. The rearward relative displacement of the inner sleeve drives the major diameter of the inner sleeve frustoconical portion 24 into the larger diameter portion of the outer sleeve tapered bore, which in turn releases the wedging force provided by the interfering tapered surfaces. In this way, rotating the nut in the reverse direction loosens the outer sleeve from the machine element and loosens the inner sleeve from the shaft.

The angle of taper of the external surface of the inner sleeve 20 and the internal surface of the outer sleeve 50 is selected relative to the length of the threaded portion 52 of the outer sleeve. A shallower angle permits greater axial displacement of the outer sleeve 50 relative to the inner sleeve 20 with less expansion of the mounting device 10. Alternatively, a sharper angle reduces the relative axial displacement of the sleeves before expansion of the device.

The device 10 may be formed by a variety of processes. According to one process, the inner sleeve 10 is formed by turning the inner sleeve to cut the frustoconical surface 24. Specifically, the inner sleeve is rotated about the center line and a cutting tool cuts the frustoconical surface while the inner sleeve is rotated. In particular, the cutting tool is moved longitudinally along the length of the frustoconical surface while the inner sleeve is rotated about the center line 15. The cutting tool is positioned at an angle relative to the center line of the inner sleeve so that the cutting tool forms the striations 30 while cutting the frustoconical surface 24.

Similarly, the outer sleeve 50 is formed by turning the outer sleeve to cut the internal tapered surface. Specifically, the inner sleeve is rotated about the center line of the outer sleeve and a cutting tool cuts the internal tapered surface while the outer sleeve is rotated. In particular, the cutting tool is moved longitudinally along the length of the tapered internal surface while the outer sleeve is rotated about the center line. The cutting tool is positioned at an angle relative to the center line of the outer sleeve so that the cutting tool cuts the striations 60 while cutting the tapered internal surface 54. When cutting the striations 60, the outer sleeve may be rotated in the opposite direction to the direction in which the inner sleeve was turned when forming the striations 30 in the inner sleeve 20. Alternatively the inner and outer sleeves can be turned starting from opposite ends. For instance, the inner sleeve may be formed on a lathe by cutting into the sleeve while the cutting tool is advanced from the left end of the sleeve to the right end of the sleeve. The outer sleeve is then formed by advancing the cutting tool from the right end of the outer sleeve to the left end of the outer sleeve. In this way, the striations are formed as a plurality of convolutions angled in opposing directions.

The cross-hatched striations have been found to improve the torque transmitted by the mounting device 10. For instance, in a mounting device as described above with an inner sleeve configured to mount a 14 mm shaft, the inner sleeve and outer sleeve were formed with confronting striated surfaces that formed a mesh when overlapped. The device transmitted approximately 11% more torque compared with a similarly configured mounting device without the confronting striated surfaces. Similarly, a mounting device configured to mount a 16 mm shaft was formed with confronting striated surfaces as described above. The device transmitted approximately 5.5% more torque compared with a similarly configured mounting device without the overlapping striations. Further, a similarly configured mounting device having an inner sleeve configured to mount a machine element on a 1 inch shaft was formed with overlapping striations on the confronting surfaces of the inner and outer sleeves. The device transmitted approximately 9% more torque compared with a similarly configured device without the overlapping striations.

Figure 4:
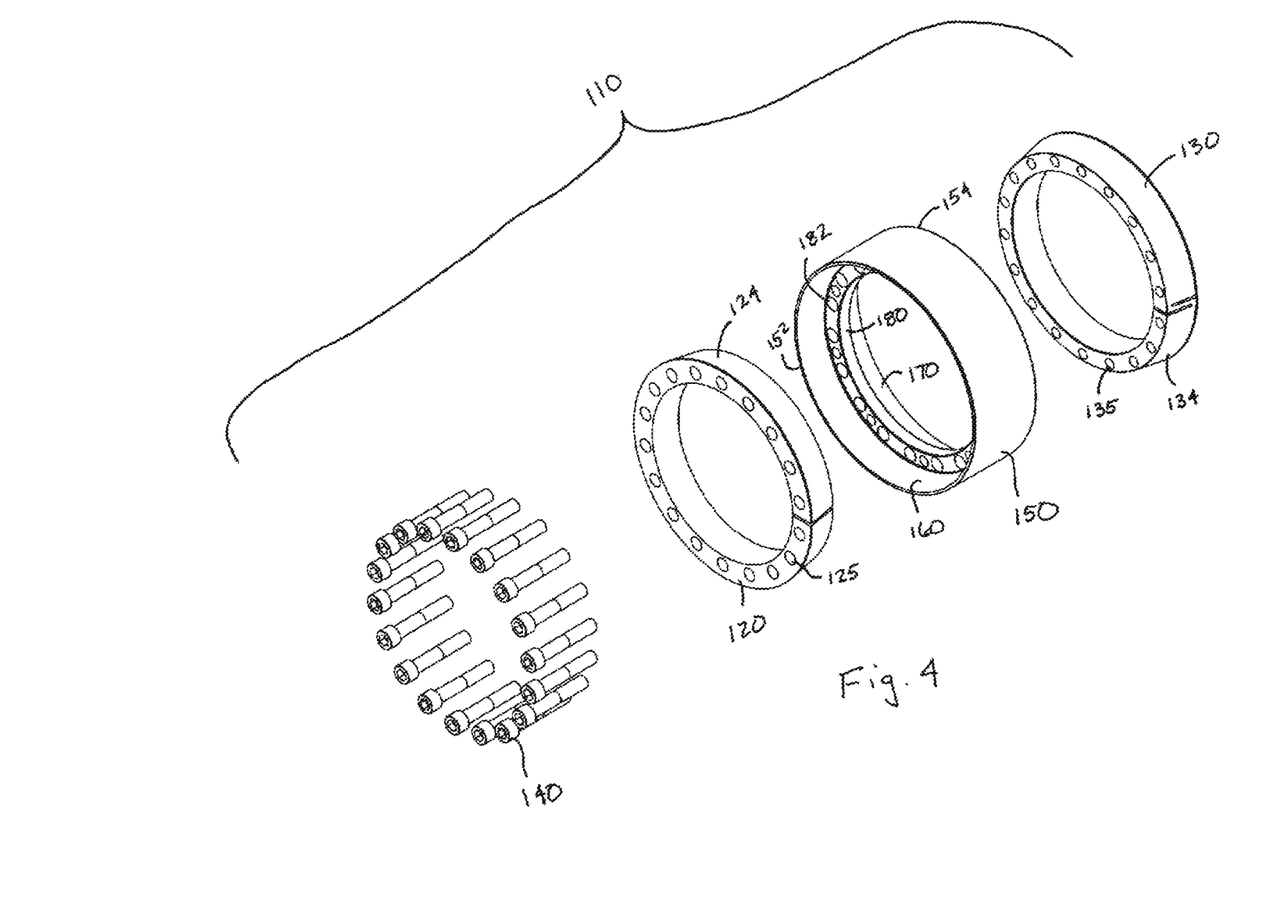
FIG. 4 is an exploded perspective view of a second embodiment of a mounting device.
Figure 5:
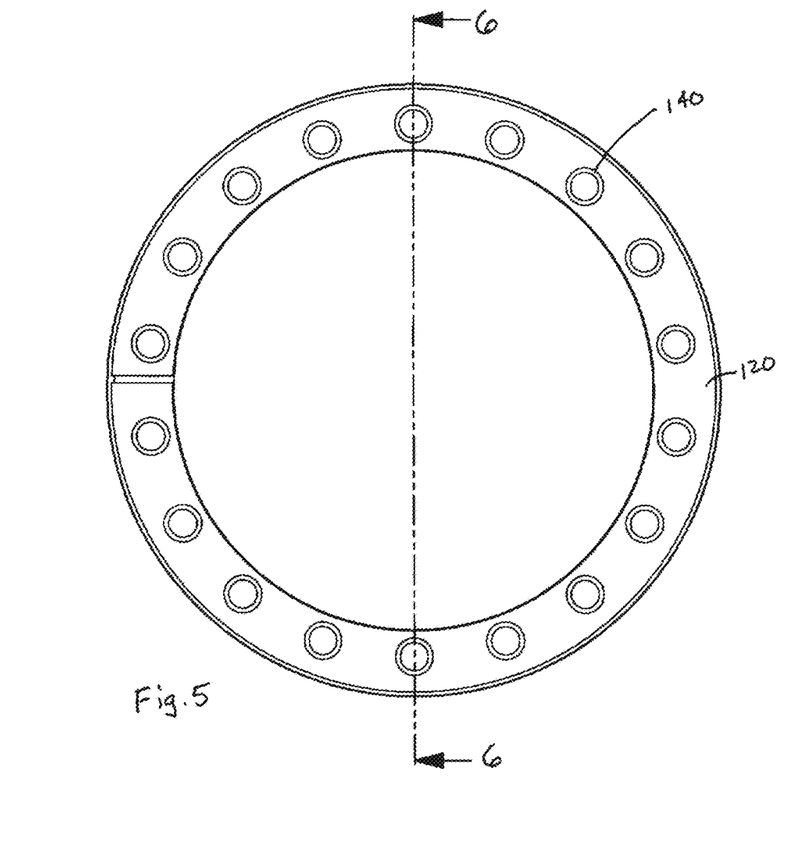
FIG. 5 is an end view of the mounting device illustrated in FIG. 4.
Figure 6:
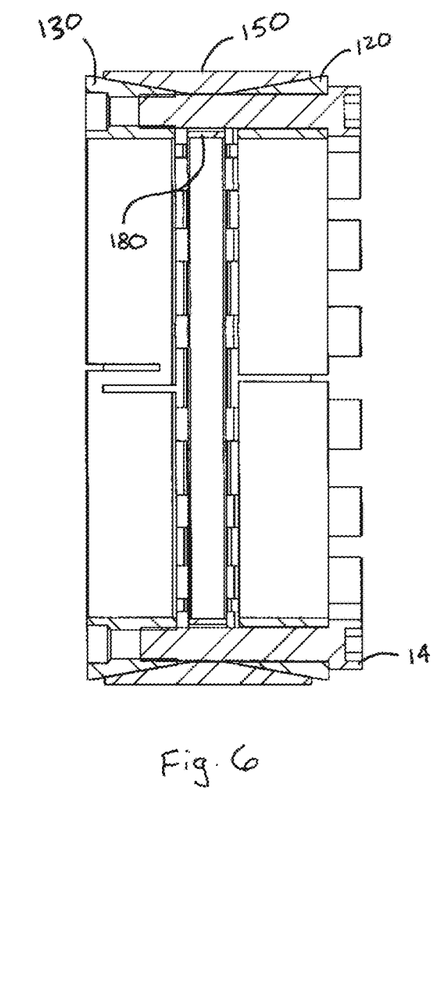
FIG. 6 is a side cross-sectional view of the mounting device illustrated in FIG. 4, taken along the line 6-6.

Referring now to FIGS. 4-6, a second embodiment of a device for coupling two rotatable elements is designated generally 110. Rather than having a central locking nut as described above, the mounting device 110 utilizes a plurality of locking screws 140 spaced around the device to tighten and release the device. The locking screws extend between opposing inner sleeves 120, 130 that are disposed within an outer sleeve 150. The components of the mounting device 110 may be formed of any of a variety of materials that are generally rigid, however, in the present instance the components are formed of metal, such as steel.

The inner sleeves 120, 130 are generally solid rings. However, the inner rings 120, 130 comprise one or more slits to facilitate expansion and contraction of the ring in response to radial forces. The slits may be through the entire thickness and length of the sleeve or the slits may be partial slits, meaning they extend through part of the length and/or thickness of the ring. In the present instance, inner ring 120 has a slit that extends through the entire thickness of inner ring 120 to facilitate radial expansion and contraction of the inner sleeves 120, whereas inner ring 130 may have a pair of overlapping slots that do not extend through the entire thickness of inner ring 130 as shown in FIG. 6.

Each inner ring has an internal bore having a diameter larger than the bore of the shaft so that the inner rings 120, 130 can slide over the shaft when the device 110 is loosened. Additionally, the outer surface of each inner ring 120, 130 is tapered to form a tapered outer surface 124, 134 such as a frustoconical surface, similar to the embodiment described above in connection with FIGS. 1-3. The inner rings are disposed within the outer sleeve 150 so that the minor diameters of tapered surfaces 124, 134 oppose one another.

Inner rings 120, 130 comprise a plurality of holes 125, 135 disposed around the circumference of each inner sleeve. The holes 125, 135 may be threaded holes, however, in the present instance, the holes in inner ring 120 are unthreaded holes, whereas the holes 135 in inner ring 130 are threaded.

Outer ring 150 includes a central internal ring 180 formed by an annular flange projecting radially inwardly from the inner surface of the outer ring. The central ring 150 has a bore that is larger than the diameter of the shaft 105 so that the shaft can extend through the bore of the outer sleeve 150. A plurality of axially extending holes is formed through the width of the central ring 180. The holes are spaced around the circumference of the central ring 180 to align with the bolt holes 125, 135 in the inner rings 120, 130.

An internally tapered surface 160 is formed in a first end 152 of the outer sleeve 150. The first tapered surface 160 is configured to mate with and cooperate with the frustoconical outer surface of the first inner ring 120. A second internally tapered surface 170 is formed in the second end 154 of the outer sleeve 150, opposite the first internally tapered surface 160. The first and second internally tapered surfaces 160, 170 are configured so that the tapers form a minor diameter adjacent the central ring 180 and taper outwardly towards the first and second ends 152, 154 of the outer sleeve 150 so that the first internally tapered surface has a major diameter adjacent the first end 152 of the outer sleeve and the second internally tapered surface has a major diameter adjacent the second end 154 of the outer sleeve.

The inner sleeve 120 is positioned within the first internally tapered surface of the outer sleeve 150 so that the outer tapered surface of the first inner sleeve aligns with the internally tapered surface 160 of the outer sleeve 150, similar to the mating tapered surfaces of the inner and outer sleeves described above in connection with the embodiment illustrated in FIGS. 1-3. Similarly, second inner sleeve 130 is positioned within the second internally tapered surface 170 of the outer sleeve 150 so that the outer tapered surface of the second inner sleeve aligns with the second internally tapered 170 surface of the outer sleeve. Once the inner sleeves 120 and 130 are positioned inside the outer sleeve, the bolts 150 are inserted through the holes in the first inner ring 120, then through the central ring 180 in the outer sleeve 150 and into the second inner ring to connect the two inner rings 120, 130 within the outer sleeve. The device 110 is then tightened by rotating the bolts 150.

The tapered surfaces of the inner sleeves 120, 130 and the outer sleeve 150 include a series of striations. In particular, the tapered outer surface 124 of the first inner sleeve include a first series of striations 128 and the tapered inner surface 160 of the outer sleeve include a second series of striations 168. The first striations 128 are formed as a series of overlapping convolutions similar to the striations 30 on the tapered outer surface of the inner sleeve 20 described above in connection with the first embodiment 10. Similarly, the second striations formed 168 formed on the tapered inner surface 168 of the outer sleeve 150 are substantially similar to the striations 60 formed on the outer sleeve 50 of the first embodiment of a mounting device 10 described above. In this way, the first and second striations 128, 168 are transverse one another to form a mesh when the striations overlap one another when the device 110 is assembled. The cooperating tapered surfaces 134, 170 of the second inner ring 130 and the outer sleeve 150 include striations that are substantially similar to the striations described above in connection with the first inner sleeve 120 and the outer sleeve. In particular, the second inner sleeve 130 includes a plurality of striations 138 formed on the outer tapered surface 134 and the outer sleeve includes a plurality of striations 178 formed on the internal tapered surface 170 in the second end 154 of the outer sleeve 150.

The angle, depth and width of the striations 128, 138, 168, 178 can vary depending on the size of the mounting device 110 and the application. However, the angle depth and width of the striations is preferably the same as the parameters described above for the striations 30, 60 for the embodiment illustrated in FIGS. 1-3 and described above.

As can be seen in FIG. 6, driving the inner ring 120 into the outer sleeve 150 (i.e. toward the central ring 180) drives the tapered outer surface 124 of the inner sleeve up the tapered inner surface 160 of the outer sleeve. The cooperating tapered surfaces create a wedging effect that results in a clamping force in the radial direction that deforms or deflects the outer sleeve radially outwardly to clamp onto the inner bore of a machine element. At the same time, the cooperating tapered surfaces 124, 160 deform or deflect the inner sleeve 120 radially inwardly to clamp onto a rotatable shaft within the inner sleeve. In this way, displacement of the inner sleeve 120 relative to the outer sleeve 150 mounts a machine element onto a rotary shaft in the same way as the mounting device 10 described above.

Similar to the first inner sleeve, displacing the second inner sleeve 130 into the outer sleeve 150 (i.e. toward the central ring 180) drives the tapered outer surface 134 of the inner sleeve up the tapered outer surface 170 of the outer sleeve. The cooperating tapered surfaces 134, 170 of the second inner sleeve 130 and the outer sleeve 150 also create a wedging effect that results in a clamping force in the radial direction that deforms or deflects the outer sleeve radially outwardly and the inner sleeve 130 radially inwardly. In this way, the second inner sleeve 130 operates similarly to the first inner ring 120.

The device is tightened by tightening the plurality of bolts 140 around the device. Turning the bolts 140 in a first direction pulls the first inner sleeve 120 toward the second inner sleeve 130. In this way, the first inner sleeve 120 is displaced toward the first internal tapered surface 160 of the outer sleeve and the second inner sleeve 130 is displaced toward the second internal tapered surface 170 of the outer sleeve.

By configuring the tapered surfaces 160, 170 so that the inner rings 120, 130 oppose one another, any axial forces produced by the wedging effect will tend to oppose one another and balance out, thereby impeding axial movement of the mounting device 110 along the shaft when the device is tightened. Specifically, any axial force created by the cooperating tapered surfaces of the first inner ring 120 and the inner taper 160 of the outer sleeve will be in a first direction and any axial force created by the cooperating tapered surfaces of the second inner ring 130 and the inner taper 170 of the outer sleeve will be in a second direction that is opposite the first direction. These opposing axial forces will tend to be of substantially the same magnitude, so that the resultant axial force is negligible compared to the radial clamping force.

In the foregoing description of the mounting device 110, the device is described as having two opposing inner sleeves 120, 130. Using two inner sleeve increases the radial clamping force as well as reducing the resultant axial forces created during tightening of the device. It should be understood that the mounting device does not necessarily include two opposing internal sleeve 120, 130. Instead, the device may include a single internal sleeve that is displaced into the outer sleeve as described above. In such an embodiment, the outer sleeve includes threaded holes that the bolts engage to tighten the inner sleeve into the outer sleeve.

It will be recognized by those skilled in the art that changes or modifications may be made to the above-described embodiments without departing from the broad inventive concepts of the invention. For instance, in the foregoing description, the connection between the outer sleeve and the nut allows rotation of the nut relative to the outer sleeve but impedes axial displacement of the outer sleeve relative to the net. Additionally, the inner sleeve is threadedly connected with the nut so that rotation of the nut relative to the inner sleeve causes the inner sleeve to displace axially relative to the outer sleeve. However, the connections between the sleeves and the nut may be reversed, so that the inner sleeve has a circumferential groove that cooperates with a groove on the nut to captively retain the inner sleeve, thereby impeding relative displacement of the inner sleeve relative to the nut. In such a configuration, the outer sleeve includes a threaded portion and the nut threadedly engages the outer sleeve to effectuate relative displacement of the outer sleeve and the nut when the nut is rotated. Additionally, in the embodiment described above, the inner sleeve is externally threaded and the nut is internally threaded. In certain applications, the threads can be reversed, so that the nut is externally threaded and the inner sleeve is internally threaded. Similarly, if the outer sleeve is threaded, the outer sleeve may be internally threaded. It should therefore be understood that this invention is not limited to the particular embodiments described herein, but is intended to include all changes and modifications that are within the scope and spirit of the invention as set forth in the claims.

What is claimed is:

1. A device for coaxially mounting a machine element having a bore upon a shaft comprising:
   a nut having threads and a first connector;
   an outer sleeve for engaging the machine element, comprising:
      an external surface configured to cooperate with the bore of the machine element;
      a tapered internal surface;
      at least one axial slot extending longitudinally along the outer sleeve to permit radial expansion of the outer sleeve;
      a helical striation formed on the tapered internal surface wherein the helical striation comprises a plurality of convolutions having a lead angle;
   an inner sleeve for encircling the shaft, comprising:
      a tapered external surface corresponding in angle of taper to the tapered internal surface of the outer sleeve;
      at least one axial slot extending longitudinally along the inner sleeve to permit radial expansion of the inner sleeve; and
      a helical striation formed on the tapered external surface wherein the helical striation comprises a plurality of convolutions wherein the striations of the inner sleeve have a lead angle that is similar to the lead angle of the striations of the outer sleeve but in a negative direction;
   wherein one of the inner and outer sleeves comprises a threaded portion cooperable with the threaded portion of the nut and the other of the inner and outer sleeves comprises a second connector cooperable with the first connector to connect the other of the inner and outer sleeves with the nut to impede substantial axial displacement of the sleeve relative to the nut while allowing rotation of the nut relative to the other of the inner and outer sleeves;
   wherein rotating the nut in a first direction displaces the inner sleeve in a first direction relative to the outer sleeve, thereby causing the inner sleeve to contract against the shaft and the outer sleeve to expand against the bore of the machine element, and wherein rotating the nut in a second direction displaces the inner sleeve in a second direction relative to the outer sleeve, thereby loosening the inner sleeve from the shaft and the outer sleeve from the bore of the machine element.

2. The device of claim 1 wherein the striations on the outer sleeve are transverse to the striations on the inner sleeve.

3. The device of claim 2 wherein the lead angle of the striations of the outer sleeve is an angle relative to a plane normal to an axis of rotation of the outer sleeve.

4. The device of claim 3 wherein the lead angle is less than 20 degrees.

5. The device of claim 4 wherein the lead angle is between 1 and 5 degrees.

6. The device of claim 5 wherein the striations on the outer sleeve are less than 0.010" in depth.

7. The device of claim 6 wherein the striations on the outer sleeve are 0.001"-0.005" in depth.

8. The device of claim 1 wherein the striations of the inner and outer sleeves overlap to form a mesh.

9. The device of claim 1 wherein the other of the inner and outer sleeves comprises a plurality of axially elongated slots, wherein the configuration and orientation of the slots provide sufficient radial flexibility to allow the other of the inner and outer sleeves to deflect to fit over the first connector of the nut.

10. The device of claim 9 wherein the first connector comprises a circumferential groove and the second connector comprises a flange extending radially inwardly, wherein the other of the inner and outer sleeves is sufficiently resilient such that the other of the inner and outer sleeves contracts after flexing to fit the flange into the groove.

11. The device of claim 1 wherein the outer sleeve is a one-piece sleeve comprising a plurality of slots forming a plurality of sections connected by a web that allows the outer sleeve to resiliently deflect radially.

12. A device for coaxially mounting a machine element having a bore upon a shaft comprising:
   a threaded tightening element;
   an outer sleeve for engaging the machine element wherein the outer sleeve is rotatable about an axis of rotation, comprising:
      an external surface configured to cooperate with the bore of the machine element;
      a tapered internal surface;
      at least one axial slot extending longitudinally along the outer sleeve to permit radial expansion of the outer sleeve;
      a plurality of striations formed on the tapered internal surface forming a plurality of convolutions having a lead angle, wherein the lead angle is the angle between one of the convolutions and the axis of rotation;
   an inner sleeve for encircling the shaft, comprising:
      a tapered external surface corresponding in angle of taper to the tapered internal surface of the outer sleeve;
      at least one axial slot or groove extending longitudinally along the inner sleeve to permit radial expansion of the inner sleeve; and
      a plurality of striations formed on the tapered external surface forming a plurality of convolutions wherein the striations of the inner sleeve have a lead angle that is transverse the lead angle of the striations of the outer sleeve;
   wherein one of the inner and outer sleeves comprises a threaded portion cooperable with the threaded tightening element;
   wherein rotating the threaded tightening element in a first direction displaces the inner sleeve in a first direction relative to the outer sleeve, thereby causing the inner sleeve to contract against the shaft and the outer sleeve to expand against the bore of the machine element.

13. The device of claim 12 wherein the threaded tightening element is a bolt.

14. The device of claim 12 wherein the threaded tightening element is a nut.

15. The device of claim 12 comprising a second inner sleeve having a tapered external surface and the outer sleeve comprises a second tapered internal surface, wherein the tapered external surface of the second inner sleeve cooperates with the second tapered internal surface to provide a radial clamping force when the threaded tightening element is rotated in the first direction, wherein a plurality of striations are formed on the tapered external surface of the second inner sleeve and a plurality of striations are formed on the second tapered internal surface.

16. The device of claim 15 wherein rotating the threaded tightening element in the first direction draws the inner sleeve toward the second inner sleeve.

17. The device of claim 12, wherein the lead angle is less than 20 degrees.

18. The device of claim 17 wherein the lead angle is between 1 and 5 degrees.

19. The device of claim 12 wherein the striations on the outer sleeve are less than 0.010" in depth.

20. The device of claim 19 wherein the striations on the outer sleeve are 0.001"-0.005" in depth.

21. The device of claim 12 wherein the striations of the inner and outer sleeves overlap to form a mesh.

22. The device of claim 12 wherein the threaded tightening element is a nut having a first connector and one of inner and outer sleeve comprises a second connector for connecting with the first connector to impede relative displacement of the nut and the inner or outer sleeve, wherein the inner and outer sleeves comprises a plurality of axially elongated slots, wherein the configuration and orientation of the slots provide sufficient radial flexibility to allow the one of the inner and outer sleeves to deflect to fit over the first connector of the nut.

23. The device of claim 22 wherein the first connector comprises a circumferential groove and the second connector comprises a flange extending radially inwardly, wherein the one of the inner and outer sleeves is sufficiently resilient such that the one of the inner and outer sleeves contracts after flexing to fit the flange into the groove.

* * * * *

UNITED STATES PATENT AND TRADEMARK OFFICE
CERTIFICATE OF CORRECTION

| | | |
|---|---|---|
| PATENT NO. | : 10,364,847 B2 | Page 1 of 1 |
| APPLICATION NO. | : 15/216300 | |
| DATED | : July 30, 2019 | |
| INVENTOR(S) | : Matthew Johnson et al. | |

It is certified that error appears in the above-identified patent and that said Letters Patent is hereby corrected as shown below:

In the Specification

Column 4, Line 1, "the striations may be than 0.001 mm" should read -- the striations may be less than 0.001 mm --.

Signed and Sealed this
Twenty-fourth Day of September, 2019

Andrei Iancu
*Director of the United States Patent and Trademark Office*